(12) United States Patent
She (10) Patent No.: US 9,507,821 B2
(45) Date of Patent: Nov. 29, 2016

(54) MAIL INDEXING AND SEARCHING USING HIERARCHICAL CACHES

(71) Applicant: Alibaba Group Holding Limited, George Town (KY)

(72) Inventor: Zhiyong She, Hangzhou (CN)

(73) Assignee: Alibaba Group Holding Limited (KY)

( * ) Notice: Subject to any disclaimer, the term of this patent is extended or adjusted under 35 U.S.C. 154(b) by 178 days.

(21) Appl. No.: 14/029,445

(22) Filed: Sep. 17, 2013

(65) Prior Publication Data

US 2014/0089258 A1   Mar. 27, 2014

(30) Foreign Application Priority Data

Sep. 21, 2012 (CN) .......................... 2012 1 0357269

(51) Int. Cl.
*G06F 17/30* (2006.01)

(52) U.S. Cl.
CPC ... *G06F 17/30424* (2013.01); *G06F 17/30622* (2013.01); *G06F 17/30631* (2013.01)

(58) Field of Classification Search
CPC ................................................ G06F 17/30622
USPC .................................................. 707/741, 742
See application file for complete search history.

(56) References Cited

U.S. PATENT DOCUMENTS

| 5,829,025 A * | 10/1998 | Mittal ................. G06F 9/30047 711/122 |
| 6,983,322 B1 | 1/2006 | Tripp et al. |
| 2005/0172076 A1* | 8/2005 | Olson ................. G06F 12/0897 711/122 |
| 2007/0073813 A1 | 3/2007 | Kamat et al. |
| 2009/0319724 A1* | 12/2009 | Oe ....................... G06F 12/0888 711/113 |
| 2010/0161615 A1* | 6/2010 | Lee .......................... G06F 21/80 707/741 |
| 2011/0179075 A1* | 7/2011 | Kikuchi ............ G06F 17/30011 707/769 |
| 2012/0089791 A1 | 4/2012 | Oberhofer et al. |
| 2012/0137075 A1* | 5/2012 | Vorbach .................. G06F 9/526 711/122 |
| 2012/0158740 A1 | 6/2012 | Smola et al. |
| 2012/0166404 A1* | 6/2012 | Palakodety ....... G06F 17/30622 707/693 |
| 2013/0036277 A1* | 2/2013 | Szczepkowski ...... G06F 3/0608 711/159 |

FOREIGN PATENT DOCUMENTS

| CN | 101150529 | 3/2008 |
| CN | 101576927 | 11/2009 |
| JP | 2002351797 | 12/2002 |
| WO | 2007040503 | 4/2007 |
| WO | 2010129063 | 11/2010 |
| WO | WO2010129063 | * 11/2010 |

* cited by examiner

*Primary Examiner* — Robert Beausoliel, Jr.
*Assistant Examiner* — Alexandria Bromell
(74) *Attorney, Agent, or Firm* — Van Pelt, Yi & James LLP (57) ABSTRACT

Electronic mail message processing includes: obtaining a set of keywords associated with an electronic mail message; updating, based at least in part on the set of keywords, a set of inverted index records stored in a level 1 cache; determining whether size of the set of inverted index records stored in the level 1 cache exceeds a first preset threshold value; in the event that the first preset threshold value is exceeded, transferring the set of inverted index records in the level 1 cache to a level 2 cache; determining whether size of a level 2 cache file exceeds a second preset threshold value; in the event that the second preset threshold value is exceeded, transferring, according to a path file, inverted index records in the level 2 cache file to a level 3 cache storing a set of inverted index files.

18 Claims, 8 Drawing Sheets

MAIL INDEXING AND SEARCHING USING HIERARCHICAL CACHES

CROSS REFERENCE TO OTHER APPLICATIONS

This application claims priority to People's Republic of China Patent Application No. 201210357269.6 entitled METHOD AND SYSTEM FOR ESTABLISHING MAIL INDICES AND METHOD AND SYSTEM FOR SEARCHING MAIL, filed Sep. 21, 2012 which is incorporated herein by reference for all purposes.

FIELD OF THE INVENTION

The present application relates to the field of network data processing. In particular, it relates to a method and system for establishing mail indices to perform mail searches.

BACKGROUND OF THE INVENTION

As Internet communications become increasingly widespread, and with more and more users communicating by mail (specifically, electronic mail or email), mailbox searches have become an important search technique among data searches. Mailbox searches are typically based on mailbox indices. That is, all of a user's mail will typically be searched using a mailbox index.

One existing method for establishing mail indices is as follows: on the whole, mail box indices are established in the form of inverted indices. For example, there are three mail files with the names: doc_id1, doc_id2, and doc_id3, all of which contain the phrase "hello my world." Thus, the inverted index records storing mappings of keyword and mail files are as shown below:

```
hello ->doc_id1, doc_id2, doc_id3,
my ->doc_id1, doc_id2, doc_id3,
world ->doc_id1, doc_id2, doc_id3;
```

The inverted index records described above are stored in an inverted index file. The offset position and length of each inverted index record in the inverted index file are recorded, and the offset position is written into a dictionary file in the manner described below:

{"hello": {"file_path":"/xxx/inverted_index_file", "offset":0}};

Assuming that a user searches mail that includes "hello," it is possible to find all mail containing this keyword in a dictionary file. That is, the address "/xxx/inverted_index_file" is found. Then this inverted index file is opened, the position for the offset "0" is fetched, and thus three pieces of mail {doc_id1, doc_id2, doc_id3} may be fetched.

However, when new mail is added, the inverted index file needs to be updated in order to ensure the completeness of search results. For example, a new piece of mail, doc_id4, is added. This piece of mail also contains "hello my world," a total of three keywords. Thus, at this point, the inverted index records need to be updated as follows:

```
hello ->doc_id1, doc_id2, doc_id3, doc_id4,
my ->doc_id1, doc_id2, doc_id3, doc_id4,
world ->doc_id1, doc_id2, doc_id3, doc_id4;
```

If the updated inverted index records are saved to the inverted index file, the original storage locations of two inverted index records, "my→doc_id1, doc_id2, doc_id3, doc_id4" and "world→doc_id1, doc_id2, doc_id3, doc_id4" need to be changed within the inverted index file. At the same time, the corresponding offset values in the dictionary file need to be revised.

Therefore, with the method described above, other related data content of the inverted index file needs to be shifted whenever a new piece of mail is added.

Existing mailbox searches using mail indices as described above typically require keyword searches of entire inverted index files. As the scale of mail data expands, mailbox servers may have hundreds of millions of subscribers and billions of individual mail messages. To store such large volumes of data will require large amounts of hard disk IO resources, making it difficult to impossible to quickly index mailboxes. Furthermore, the storage costs of vast quantities of mail are very high for mailbox servers. Large quantities of storage resources can be tied up as a result.

BRIEF DESCRIPTION OF THE DRAWINGS

Various embodiments of the invention are disclosed in the following detailed description and the accompanying drawings.

In order to more clearly describe the technical proposals of the embodiments of the present application or the prior art, the following are brief overviews of the drawings that need to be used in describing the embodiments or the prior art. Obviously, the drawings in the descriptions below are only some of the embodiments stated in the present application. Persons with ordinary skill in the art may obtain other drawings on the basis of these drawings without expending creative effort.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques described in the present application can be used in many general purpose or specialized computer system environments or configurations. Examples of these include: personal computers, servers, handheld devices or portable equipment, tablet type equipment, multiprocessor systems, microprocessor-based systems, set-top boxes, programmable consumer electronic equipment, networked PCs, minicomputers, mainframe computers, distributed computing environments that include any of the systems or equipment above, and so forth.

The present application can be described in the general context of computer executable commands executed by a computer, such as a program module. Generally, program modules include routines, programs, objects, components, data structures, etc. to execute specific tasks or achieve specific abstract data types. The present application can also be carried out in distributed computing environments. In such distributed computing environments, tasks are executed by remote processing equipment connected via communication networks. In distributed computing environments, program modules can be located on storage media at local or remote computers that include storage equipment.

Figure 1A:
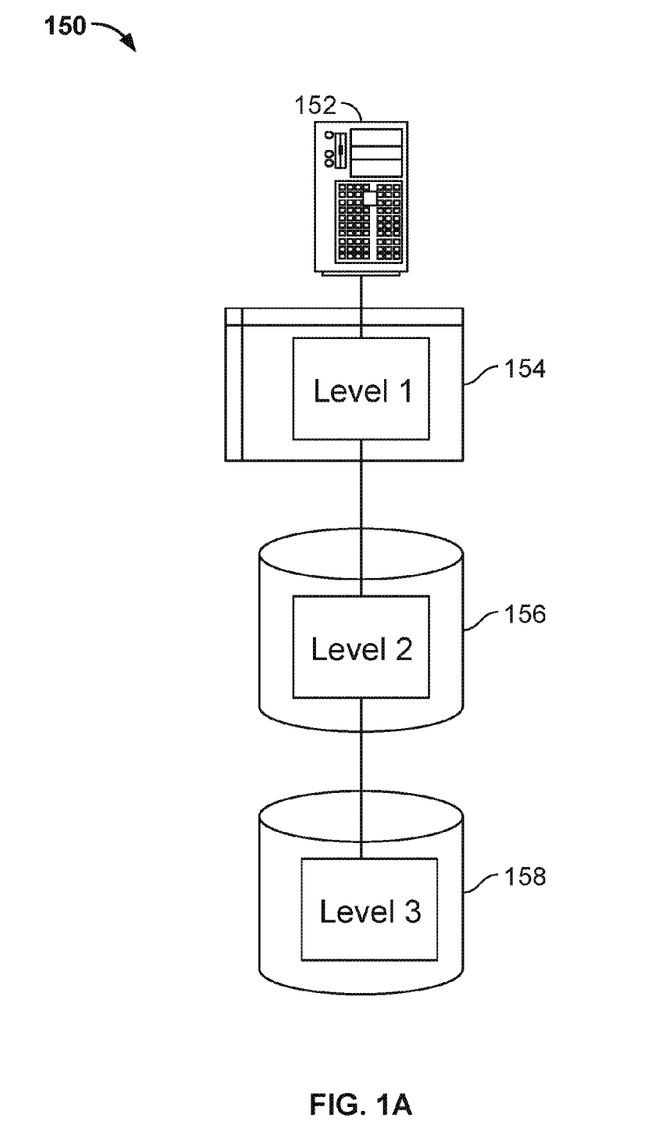
FIG. 1A is a block diagram illustrating an embodiment of a mail indexing system that employs multiple levels of caches.

FIG. 1A is a block diagram illustrating an embodiment of a mail indexing system that employs multiple levels of caches. In this example, system 150 comprises one or more mailbox servers 152 and hierarchically organized caches 154-158. Mailbox server 152 indexes email messages and stores the index information in hierarchically organized caches. Three cache levels are shown for purposes of illustration, although a different number of caches may be used in other embodiments. Level 1 cache is implemented using low latency memory, such as random access memory (RAM) of server 152. Level 2 and level 3 caches are implemented using one or more components that have higher latency than the low latency memory used to implement level 1 cache, such as hard disks or other storage devices. In some embodiments, the inverted index records established for mail are saved to the level 1 cache first. When data stored in the level 1 cache reaches a first preset threshold value, all the level 1 inverted index records in the level 1 cache are transferred to the level 2 cache file to free up room for future inverted index records. Level 2 cache stores cache files. When the amount of data in level 2 cache reaches a second preset threshold value, level 2 data is transferred to the level 3 cache, which stores inverted index files. This process for establishing mail indices can reduce the frequency of hard disk reading and writing and thus improve hard disk input/output (I/O) performance.

Figure 1B:
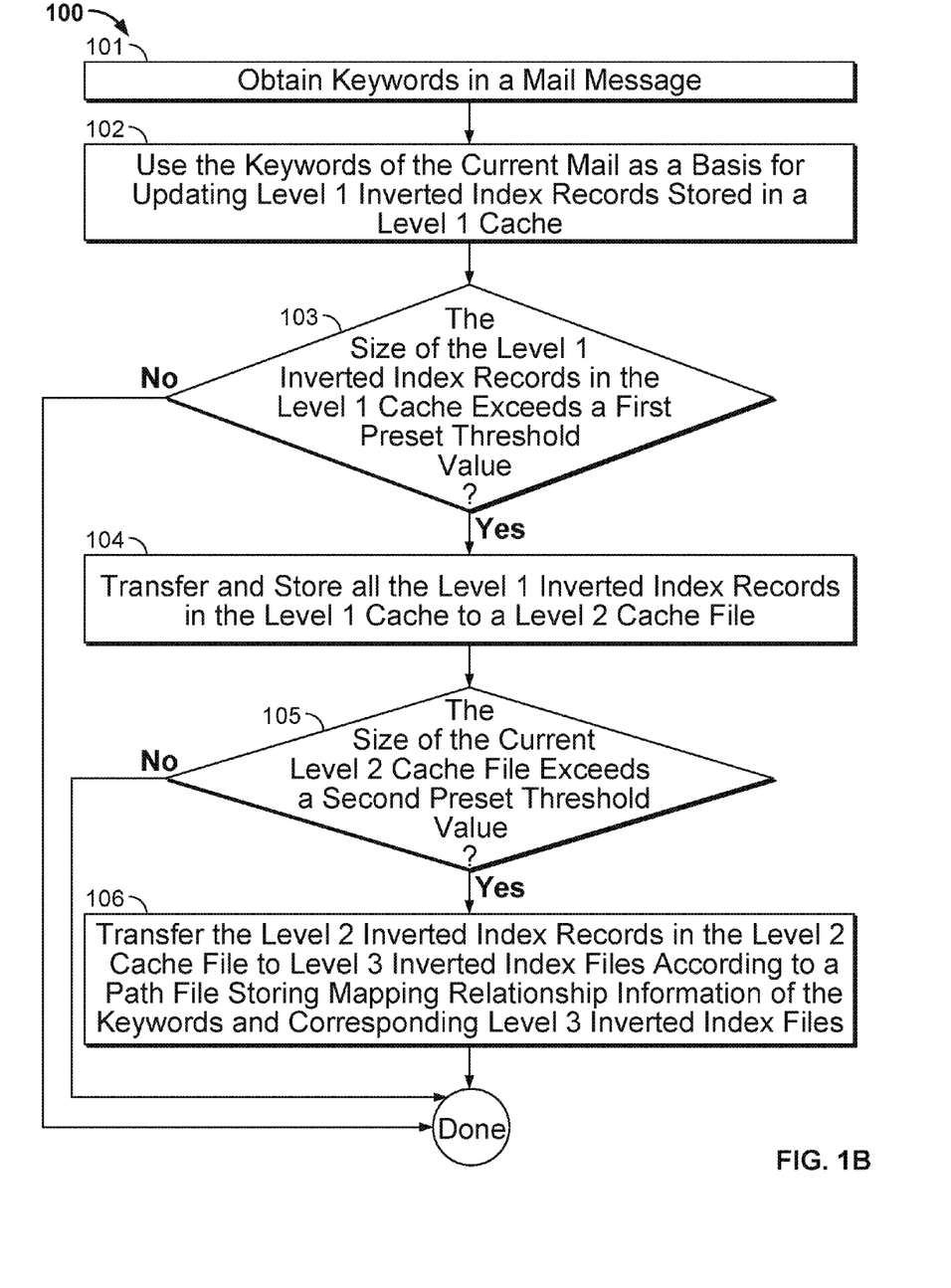
FIG. 1B is a flowchart depicting an embodiment of a process for establishing mail indices.

FIG. 1B is a flowchart depicting an embodiment of a process for establishing mail indices. Process 100 may be performed on a system such as 150.

At 101, an email message is processed to obtain keywords associated with the email message.

In some embodiments, word segmentation is performed on the email message whose index is to be established to obtain the keywords of the email message. In some embodiments, an index is established on the text of the email only, and therefore word segmentation only applies to the text of the email. In some embodiments, the message's subject also needs to serve as a basis for establishing an index, and therefore word segmentation is applied to both the mail text and the mail subject to obtain the mail keywords. Persons skilled in the art may realize this step by selecting word segmentation tools according to specific requirements of the system.

It can be understood here that, for every new piece of mail that a user receives, the mail index establishing method disclosed in embodiments of the present application may be implemented on that new piece of mail.

At 102, the obtained keywords are used as a basis for updating level 1 inverted index records stored in a level 1 cache.

After the current mail undergoes word segmentation, inverted index records establishing a correspondence between the keywords and the mail message are generated. For example, assume that the identifier for the current mail is "doc5" and that this current mail has two keywords, "keyword1" and "keyword5." In this case, the inverted index records are generated as shown below:

keyword1:doc5
keyword5:doc5

In some embodiments, a level 1 cache is configured in low latency memory to save the initial inverted index records. That is, the inverted index records that are first generated for the current mail are, at the very beginning, stored only in the level 1 cache in memory. The inverted index records comprise key-value pairs. The "key" of the inverted index records in the level 1 cache refers to the various keywords, and the "value" is the identifier of the mail message. Assume that the initial inverted index records of the level 1 buffer in the present embodiment are:

keyword1: doc1, doc2, doc3;
keyword2: doc1, doc4.

Thus, the inverted index records newly generated from the current mail are merged into the existing inverted index records to update the inverted index records in the level 1 cache, and the updated inverted index records are as follows:

```
keyword1: doc1, doc2, doc3, doc5;
keyword2: doc1, doc4;
keyword5: doc5.
```

At 103, it is determined whether the size of the level 1 inverted index records in the level 1 cache exceeds a first preset threshold value. If yes, control is transferred to 104; otherwise, the process ends.

In some embodiments, at least two cache levels are configured to realize I/O operations. The level 1 cache is configured in low latency memory and data is stored as memory-mode inverted index records. The level 2 cache is configured using a higher latency memory or storage component such as a hard disk. Whenever new mail is processed to obtain inverted index records, the records are written into the level 1 cache. When the level 1 cache in memory reaches a first preset threshold value, e.g., 2 MB, all of the inverted index records in the level 1 cache are written to a buffer file in the level 2 cache.

If the size of the level 1 cache has not reached a first threshold value, inverted index records of the current mail message are written into the level 1 cache. When the user conducts a subsequent search, the current mail can be found in the level 1 cache if the current mail complies with the search requirements. The index-establishing process flow for the current mail is then ended.

At 104, all the level 1 inverted index records in the level 1 cache are transferred to a level 2 cache and stored in a level 2 cache file. In some embodiments, transferring is implemented as copying data to the new location followed by deleting the data from the old location. The inverted index records are merged into existing inverted index records as described in 102.

At 105, it is determined whether the size of the current level 2 cache file exceeds a second preset threshold value. If yes, then control is transferred to 106; otherwise, the process ends.

In the embodiment of the present application, a threshold size (a second preset threshold value) is configured for the level 2 cache file so that, when the current level 2 cache file into which the level 1 inverted index records in the level 1 cache have been written reaches a preset threshold value, all the level 2 inverted index records in the level 2 cache file are written into the level 3 inverted index file.

At this step, when the size of the level 2 cache file has not reached the first preset threshold value, then inverted index records of the current mail are written into the level 2 cache file. That is, the inverted index records of the current mail have been saved to the level 2 cache file. When the user conducts a subsequent search, the current mail can be found in the level 2 cache file if the current mail complies with the search requirements. The index-establishing process flow for the current mail is then ended.

The level 2 cache file serves as a buffer used to avoid the following phenomenon: after the level 1 buffer in memory has been filled, it becomes necessary to simultaneously write multiple level 3 inverted index files when inverted index records in the level 1 buffer are being written directly into level 3 inverted index files belonging to the various keywords. For example, suppose that there are 10 inverted index records in the level 1 cache in memory, and the 10 keywords in these 10 inverted index records separately belong to five level 3 inverted index files. If, at this point, the inverted index records in the level 1 cache are directly written into the level 3 inverted index files, then writing operations need to be simultaneously executed on five level 3 inverted index files. With a level 2 cache file serving as a buffer file, these 10 inverted index records need only be written into one level 2 cache file. With the addition of other inverted index records (some of which may ultimately be written to the same five level 3 inverted index files), when the level 2 cache file increases to a certain threshold value (e.g., 4 MB), a one-time classification is performed on the level 2 inverted indexes in the level 2 cache file. The 10 inverted index records along with many other inverted index records in the buffer file are written into the level 3 inverted index files to which the keywords belong. This greatly reduces the frequency of file writing onto the hard disk.

At 106, all the level 2 inverted index records in the level 2 cache file are transferred to level 3 inverted index files according to a path file. This path file saves the mapping relationships establishing correspondences between the keywords and the level 3 inverted index files. In some embodiments, a path file can be generated to record the mapping relationships of the keywords and the level 3 inverted index files, i.e., which keywords are saved in which level 3 inverted index file. The path file records the mapping relationships from the keywords to the level 3 inverted index files. An example of the records in a path file appears below:

```
keyword1~keyword3: /xx/leve_3_inverted_index_file_name_1
keyword2~keywordx:/xx/ leve_3_inverted_index_file_name_2
...
keywordn~keywordm:/xx/ leve_3_inverted_index_file_name_n
```

The keywords may be stored alphabetically in different deposit files. In one example, keyword1 is "abacus," keyword 3 is "azure," keyword2 is "back," keywordx is "butter," etc. Other arrangements are possible. After the path file is configured, it becomes possible in later mailbox searches to locate the level 3 inverted index files where keywords are located from the mapping relationships recorded in the path file. Then, after the system fetches the level 3 inverted index files, it can determine which pieces of mail include the keywords. Therefore, the path file defines the paths from the keywords to the level 3 inverted index files.

Figure 2:
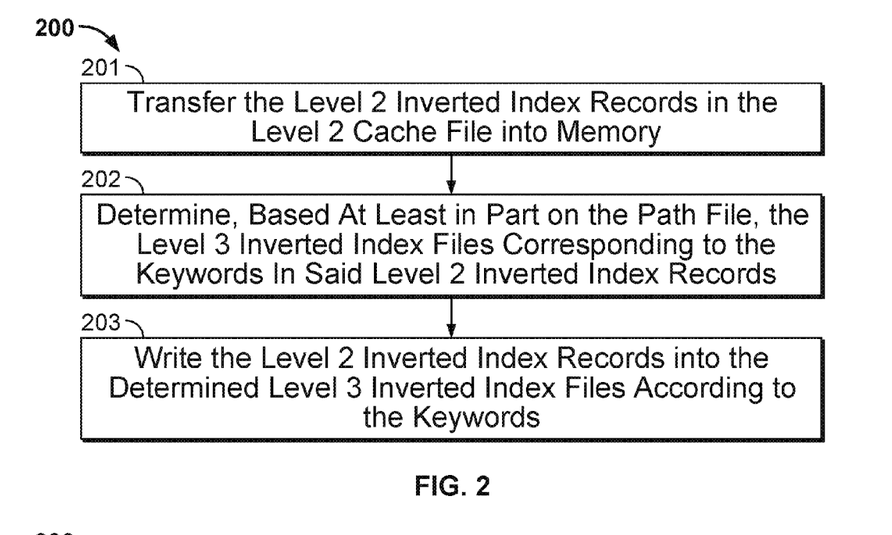
FIG. 2 is a flowchart illustrating an embodiment of a process for transferring level 2 inverted index records to the level 3 cache.

FIG. 2 is a flowchart illustrating an embodiment of a process for transferring level 2 inverted index records to the level 3 cache. In some embodiments, process 200 implements 106 of process 100.

At 201, all the level 2 inverted index records in the level 2 cache file are transferred into memory (e.g., read from a disk storage location into memory).

At 202, based at least in part on the path file, the level 3 inverted index files corresponding to the keywords in the level 2 inverted index records are determined. As discussed above, the path file includes paths associated with the keywords and their respective level 3 inverted index files. The paths are used for determining the level 3 inverted index files corresponding to the keywords in the level 2 inverted index records.

At 203, the level 2 inverted index records are written into the determined level 3 inverted index files according to the keywords.

In some embodiments, the writing speed is increased by employing an append mode to perform writing operations on the level 3 inverted index files. Thus, in some embodiments, when the level 2 inverted index records are written into the level 3 inverted index files, all the inverted index records in the level 2 cache file are fetched in append mode to the determined level 3 inverted index files according to the keywords. Append mode is the standard mode used to edit files. In append mode, new data is directly added to the end of the file.

When the threshold value is exceeded, the system will fetch the pathfile. At this point, the system scans the inverted records of the buffer file and fetches the keywords, e.g., keyword1, of each record. Then, with the path file information, it learns in which inverted file the keyword1 record should be located and thereupon appends the record to the file.

The embodiment of the present application adopts an approach involving level 1 caches, level 2 cache files, and level 3 inverted index files. The inverted index records established for mail messages are saved first to the level 1 cache; when the level 1 cache reaches a first preset threshold value, then all of the level 1 inverted index records in the level 1 cache are transferred to the level 2 cache file; and when the level 2 cache files reach a second preset threshold value, the level 2 inverted index records therein are transferred to the level 3 inverted index files. This approach enables the system to avoid an excessive number of writing operations on the hard disk resulting from having numerous inverted index records for mail. The result is increased inverted index record writing speed in the process of establishing mail indices. This in turn not only increases the speed of establishing mail indices, but also reduces the impact that comes from an excessive number of writing operations on the disk and improves disk IO performance.

Furthermore, part of the mail index in the embodiment of the present application is saved in the level 1 cache which is implemented using low latency memory. Consequently, the hard disk will not store the entire mail index. Therefore, if new mail is frequently processed, the buffer in the memory will prevent it from having an excessive impact on disk writing. Moreover, by raising the speed for the newest data, it can achieve the goal of real-time searching.

Figure 3:
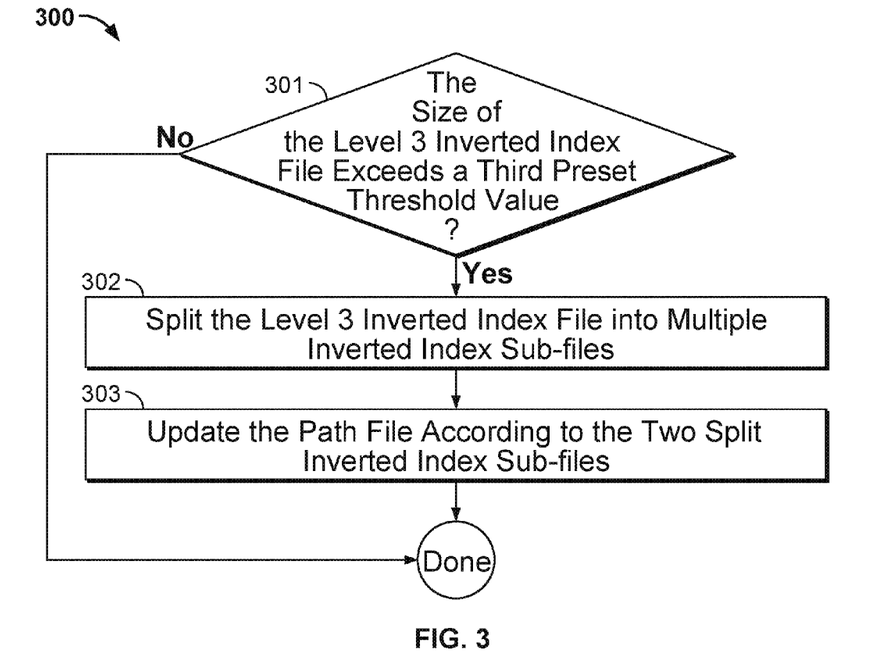
FIG. 3 is a flowchart illustrating another embodiment of a process for establishing mail indices.

FIG. 3 is a flowchart illustrating another embodiment of a process for establishing mail indices. In some embodiments, process 300 is performed after process 100 is completed.

In this example, a third preset threshold value is also established for level 3 inverted index files; when the size of a level 3 inverted index file reaches the third preset threshold value, it is split into multiple (e.g., two) inverted index sub-files, and these inverted index sub-files must be no larger than the third preset threshold value. In this way, it is possible to guarantee that each level 3 inverted index file is not excessively large and thus to guarantee the access speed for mail indices.

At 301, it is determined whether the size of the level 3 inverted index file exceeds a third preset threshold value. If yes, control is transferred to 302. The threshold value for the level 3 inverted index file can be the same as the second preset threshold value for the level 2 cache file or a different value.

In this example, the configurations of threshold value magnitudes for level 1 cache, level 2 cache file, and level 3 inverted index files take into account factors such as the number of read and write operations on the disk within a certain period of time and how much time is allotted for sending back user search results when users conduct mail searches. The smaller the file, the faster reading and writing speeds. However, a very small cache size will also lead to an excessive number of files and slower reading and writing speeds. Therefore, the magnitudes of the threshold values are empirically adjusted to suit actual conditions.

If, in the present step, the size of the level 3 inverted index file does not reach the third preset threshold value, e.g., 4 MB, the subsequent step will not be executed.

At 302, the level 3 inverted index file is split into multiple (e.g., two) inverted index sub-files.

If the level 3 inverted index file is too large, the level 3 inverted index file can be split on the basis of keywords. The file is split according to the granularity of the keywords. That is, an inverted index record corresponding to one keyword will end up in just one inverted index sub-file. Thus, when a query is subsequently made regarding the mail involved with one keyword, it will only fetch one level 3 inverted index file. Moreover, this level 3 inverted index file will not exceed a threshold size (e.g., 4 MB), thus ensuring that the mail index will be fetched quickly. An example is as follows:

```
keyword1: doc1, doc2, doc3...
keyword2: doc1, doc3, doc4...
keyword3: doc1, doc6...
...
keywordn: doc1, dock...
```

When this file is too large, it will be split into multiple (e.g., two) inverted index sub-files at the boundary of a record entry.

In some embodiments, when a level 3 inverted index file is split into two inverted index sub-files, two factors need to be taken into consideration. The first is the keyword granularity to ensure that an inverted index record corresponding to one keyword definitely exists in one inverted index sub-file. The second is the need to consider the fact that two inverted index sub-files should be as near as possible to each other in size. This way the frequency of subsequent splitting of sub-files is minimized.

At 303, the path file is updated according to the split inverted index sub-files.

Because the level 3 inverted index files which exceed the third preset threshold value are split into two inverted index sub-files each with its own identifier, the inverted index records corresponding to the various keywords in the original level 3 inverted index files undergo changes. Therefore, the path file needs to be updated in accordance with the split inverted index sub-files. After the path file has been updated, the original level 3 inverted index files can be deleted.

Figure 4:
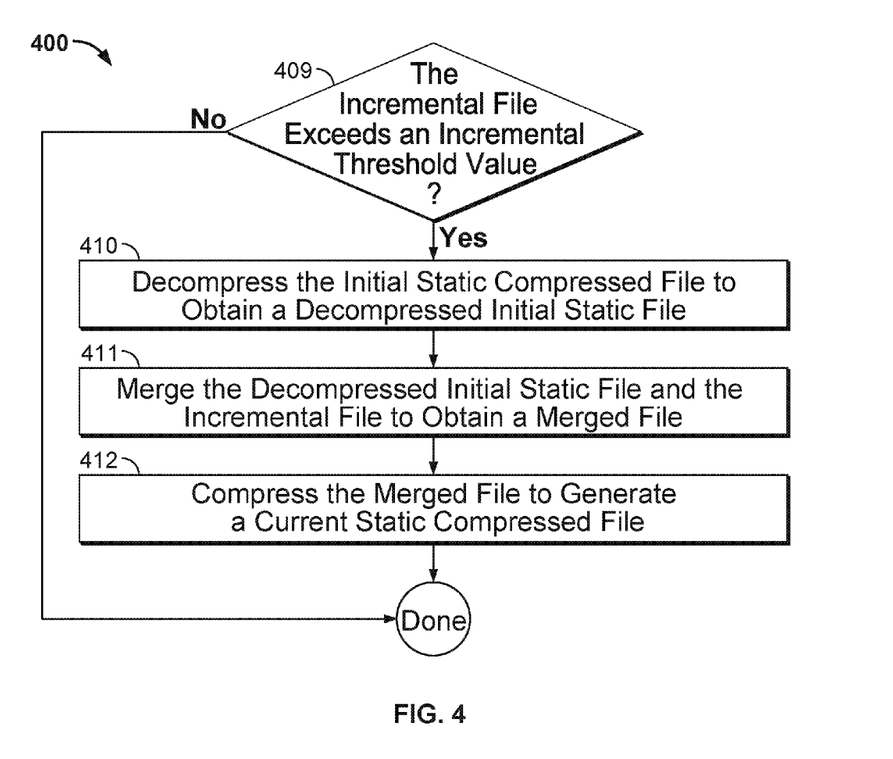
FIG. 4 is a flowchart illustrating another embodiment of a process for establishing mail indices.

FIG. 4 is a flowchart illustrating another embodiment of a process for establishing mail indices. In some embodiments, process 400 is performed after process 100 is completed. In this example, a level 3 inverted index file is configured to have two parts: an initial static compressed file (e.g., a zip file) and an incremental file, wherein the initial static compressed file saves compressed inverted index records, and the incremental file saves uncompressed inverted index records. In the present embodiment, when the inverted index records are generated for new mail, these newly generated inverted index records may be written into incremental files. As a result, mail indices can be established more quickly and the impact that comes from overly-frequent disk writing can be reduced. The disk's IO performance can be improved, and storage resources can be further conserved for level 3 inverted index files.

As discussed above, at the end of process 100, the level 2 inverted index records are transferred to the determined incremental files among the level 3 inverted index files according to a path file specifying the mapping relationship information of the keywords and corresponding level 3 inverted index files. Following process 100, at 409, it is determined whether the incremental file exceeds an incremental threshold value. If yes, then control is transferred to 410.

In the present embodiment, a threshold value is configured for incremental files. For example, an incremental file should be no greater than a threshold of 4 MB. When the incremental file reaches the preset threshold value, the content saved in the incremental file is compressed so as to reduce the size of the level 3 inverted index file and the amount of hard disk space that it occupies. If, in the present step, the incremental file doesn't exceed an incremental threshold value, the subsequent step will not be executed.

At 410, the initial static compressed file is decompressed to obtain a decompressed initial static file. In some embodiments, if the size of the incremental file exceeds the incremental threshold value, then first fetch the content of the initial static compressed file and decompress it to obtain an uncompressed initial static file.

At 411, the decompressed initial static file and the incremental file are merged to obtain a merged file.

At 412, the merged file is compressed using any appropriate technique to generate a current static compressed file (e.g., a zip file). In some embodiments, when the merged file is compressed to generate the current static compressed file, the incremental file is cleared of its original content. The purpose of all this is to lower storage costs for the level 3 inverted index files using compression technology but at the same time to reduce the calculation and disk writing costs arising from the compressing and decompressing that occurs with frequent data writing.

Figure 5:
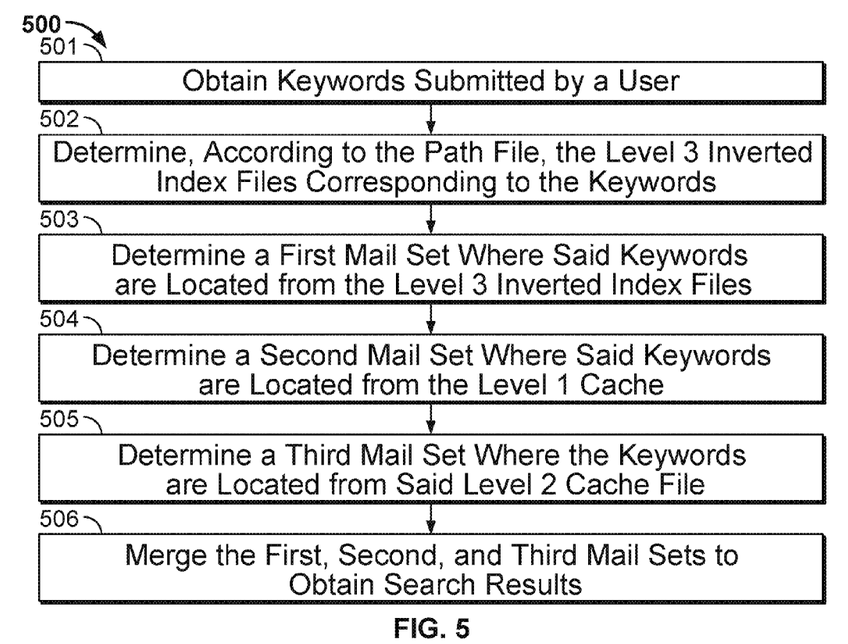
FIG. 5 is a flowchart illustrating an embodiment of a mail searching process.

FIG. 5 is a flowchart illustrating an embodiment of a mail searching process. Process 500 is performed after the mail index is established using a process such as 100.

When a user searches mail, the first step is to receive the keywords that are to be searched from the user. At 501, search keywords submitted by a user are obtained.

At 502, it is determined, according to a path file, the level 3 inverted index files corresponding to the keywords. As described above, the path file saves mapping relationships establishing correspondences between the keywords and the level 3 inverted index files.

At 503, a first mail set that includes the keywords is determined based on the level 3 inverted index files.

The level 3 inverted index files, which are determined according to the path file, include the keywords that are to be searched. In some embodiments, the level 3 inverted index files are then loaded into a binary tree data structure within the memory to facilitate search. The binary tree data structure is searched to locate mail messages that include the keywords to be searched. This set of mail messages is regarded as the first mail set.

At 504, a second mail set that includes the keywords is determined based on the level 1 cache.

In some cases, the level 1 cache may have some pieces of mail that include the keywords. When these pieces of mail in the cache have not yet reached the first preset threshold value, they will not have been fetched to the level 2 cache file. Therefore, it will be necessary to search the level 1 cache and locate these pieces of mail, which form the second mail set.

At 505, a third mail set that includes the keywords is determined based on the level 2 cache file.

In some cases, the level 2 cache file may have some pieces of mail that include the keywords. If this mail in the level 2 cache file has not yet reached the second preset threshold value, it will not have been fetched to the level 3 inverted index files. Therefore, it will then be necessary to search the level 2 cache file and locate these pieces of mail, which form the third mail set.

At 506, the first mail set, the second mail set, and the third mail set are merged to obtain search results.

Lastly, the sum of the first mail set, the second mail set, and the third mail set, which were found separately and then merged together, serves as the search results for the user's current keywords. Note that the steps can be arranged in other orders, for example, as an alternative, the first, second, and third mail sets can correspond to the mail messages from level 1 cache, level 2 cache, and level 3 cache, respectively.

During mail searches in the present embodiment, mail is searched according to the search keywords of the user in the level 1 cache, the level 2 cache file, and the level 3 inverted index files. Moreover, the sizes of the level 1 cache, the level 2 cache file, and the level 3 inverted index files will not exceed their respective preset threshold values. Thus, separate searches may be conducted on the three of them so as to reduce the frequency of hard disk reading and writing, increase mail searching speed, and also increase hard disk IO performance.

Figure 6:
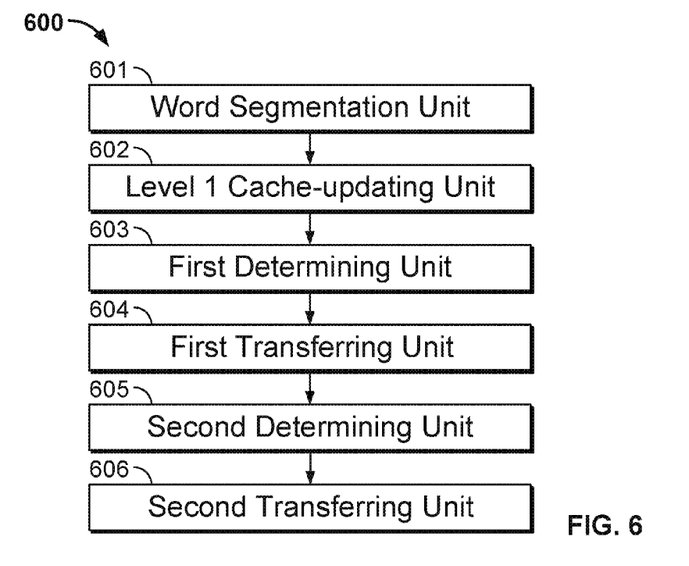
FIG. 6 is a block diagram illustrating an embodiment of a system configured to establish mail indices.

FIG. 6 is a block diagram illustrating an embodiment of a system configured to establish mail indices. The system is configured to perform a process such as 100 and includes:

A word segmentation unit 601 configured to perform word segmentation on a piece of mail to obtain its keywords.

A level 1 cache-updating unit 602, configured to use the keywords of the current mail as a basis for updating level 1 inverted index records saved in the level 1 cache.

A first determining unit 603, configured to determine whether the size of the level 1 inverted index records in the level 1 cache exceeds a first preset threshold value.

A first transferring unit 604, configured to transfer, when the result of the first determining unit is positive, all the level 1 inverted index records in the level 1 cache to a level 2 cache file.

A second determining unit 605, configured to determine whether the size of the current level 2 cache file exceeds a second preset threshold value.

A second transferring unit 606, configured to transfer, when the result of the second determining unit is positive, all the level 2 inverted index records in the level 2 cache file to level 3 inverted index files according to a path file that stores mapping relationship information of the keywords and the level 3 inverted index files.

Figure 7:
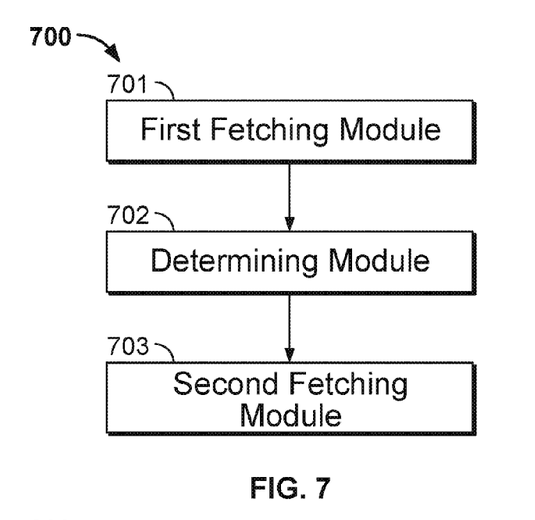
FIG. 7 is a block diagram illustrating an embodiment of a transferring unit.

FIG. 7 is a block diagram illustrating an embodiment of a transferring unit. In this example, system 700 is used to implement second transferring unit 606 of FIG. 6, which includes:

A first fetching module 701, configured to fetch (i.e., transfer) all the level 2 inverted index records in the level 2 cache file into memory.

A determining module 702, configured to use the path file as a basis to determine the level 3 inverted index files corresponding to the keywords in the level 2 inverted index records.

A second fetching module 703, configured to fetch (transfer) the level 2 inverted index records to the determined level 3 inverted index files according to the keywords. In some embodiments, second fetching module 703 is specifically configured to fetch, in append mode, all the inverted index records in the level 2 cache file to the determined level 3 inverted index files according to the keywords.

Figure 8:
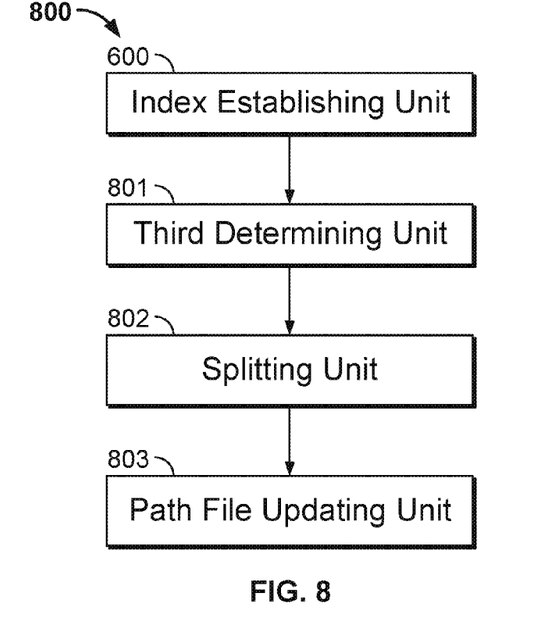
FIG. 8 is a block diagram of a system configured to establish mail indices.

FIG. 8 is a block diagram of a system configured to establish mail indices. In this example, system 800 comprises, in addition to an index establishing unit similar to 600 of FIG. 6, the following:

A third determining unit 801, configured to determine whether the size of the level 3 inverted index file exceeds a third preset threshold value.

A splitting unit 802, configured to split, when the result of the third determining unit is positive, the level 3 inverted index file into two inverted index sub-files.

A path file updating unit 803, configured to update the path file according to the two split inverted index sub-files.

Figure 9:
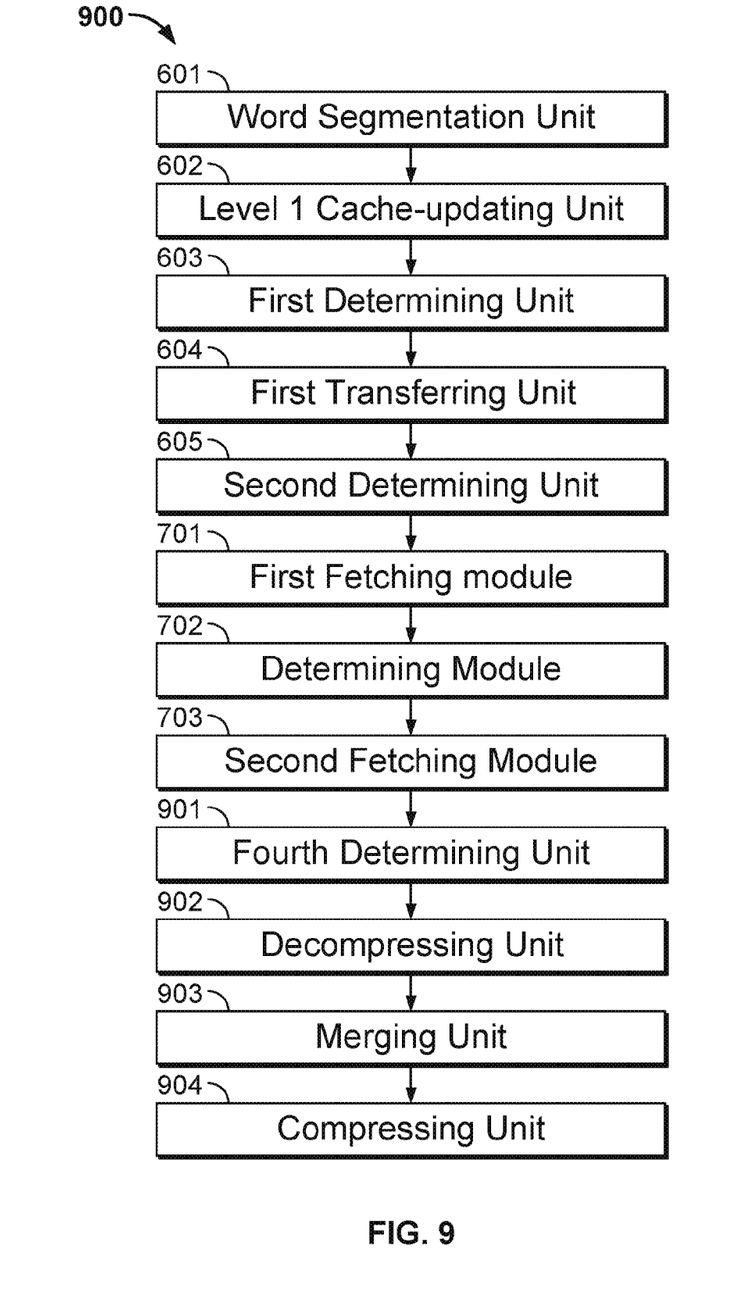
FIG. 9 is a block diagram illustrating another embodiment of a system configured to establish mail indices.

FIG. 9 is a block diagram illustrating another embodiment of a system configured to establish mail indices. System 900 comprises:

A word segmentation unit 601, configured to perform word segmentation on a mail message to obtain its keywords.

A level 1 cache-updating unit 602, configured to use the keywords of the mail message as a basis for updating level 1 inverted index records saved in the level 1 cache.

A first determining unit 603, configured to determine whether the size of the level 1 inverted index records in the level 1 cache exceeds a first preset threshold value.

A first transferring unit 604, configured to transfer, when the result of the first determining unit is positive, all the level 1 inverted index records in the level 1 cache to a level 2 cache file.

A second determining unit 605, configured to determine whether the size of the current level 2 cache file exceeds a second preset threshold value.

A first fetching module 701, configured to fetch all the level 2 inverted index records in the level 2 cache file into memory.

A determining module 702, which uses the path file for determining the level 3 inverted index files corresponding to the keywords in the level 2 inverted index records. In some embodiments, the level 3 inverted index files comprise initial static compressed files and incremental files.

A second fetching module 703, configured to fetch the level 2 inverted index records to the incremental files according to the keywords.

A fourth determining unit 901, configured to determine whether the incremental file exceeds an incremental threshold value.

A decompressing unit 902, configured to decompress the initial static compressed file to obtain a decompressed initial static file when the result of the fourth determining unit is positive.

A merging unit 903, configured to merge the initial static file and the incremental file to obtain a merged file.

A compressing unit 904, configured to compress the merged file to generate a current static compressed file.

In the present embodiment, level 3 inverted index files are categorized as compressed initial static files or as incremental files. Thus, mail indices can be established more quickly, and the impact that comes from overly-frequent disk writing can be reduced. The disk's IO performance can be improved, and storage resources can be further conserved for level 3 inverted index files.

Figure 10:
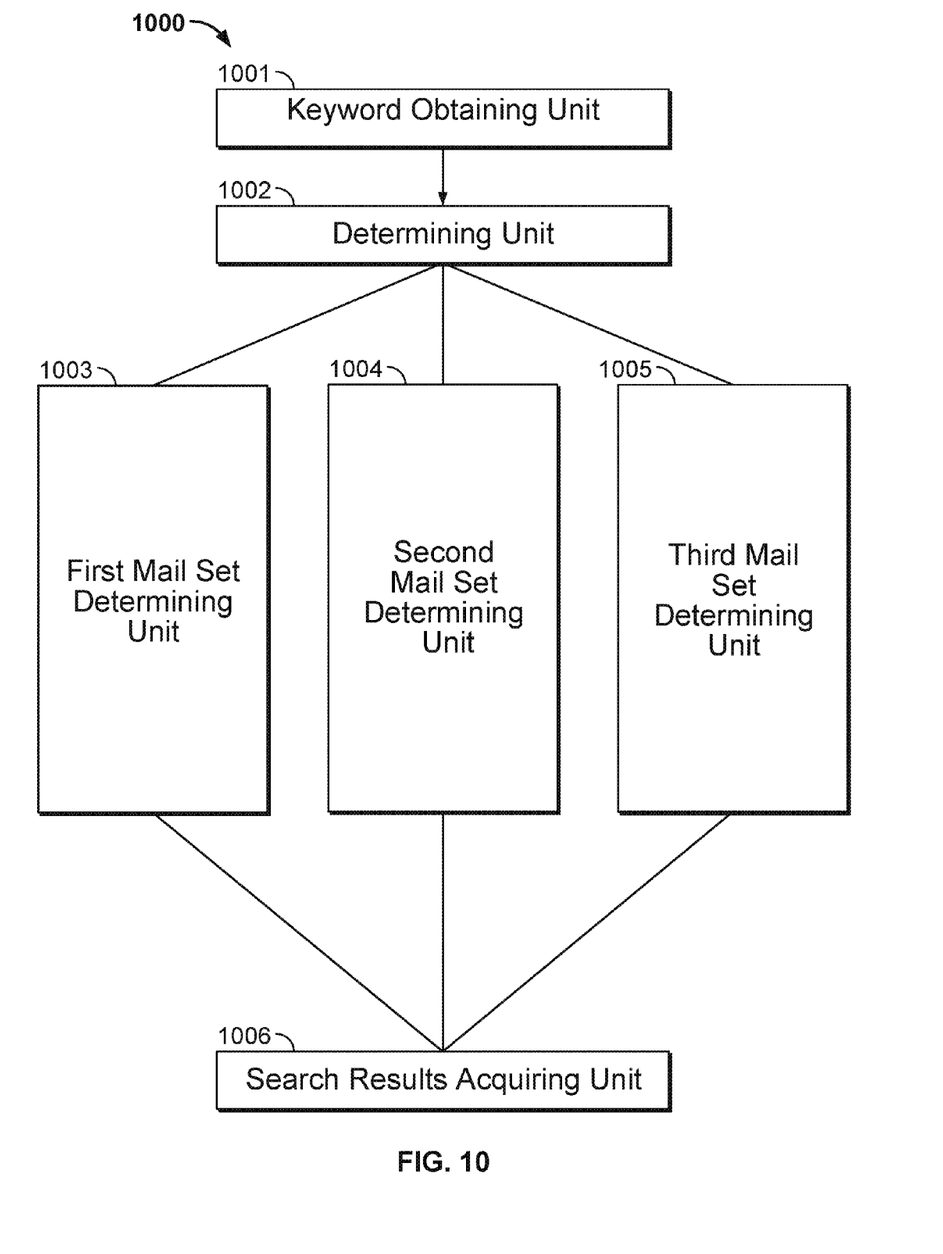
FIG. 10 is a block diagram illustrating an embodiment of a mail search system.

FIG. 10 is a block diagram illustrating an embodiment of a mail search system. Mail search system 1000 cooperates with the mail index-establishing systems described above, and comprises:

A keyword obtaining unit 1001, configured to obtain search keywords submitted by a user.

A determining unit 1002, configured to determine, according to a path file, the level 3 inverted index files corresponding to the keywords, the path file saving mapping relationships establishing correspondences between the keywords and the level 3 inverted index files.

A first mail set determining unit 1003, configured to determine a first mail set where the keywords are located from the level 3 inverted index files.

A second mail set determining unit 1004, configured to determine a second mail set where the keywords are located from the level 1 cache.

A third mail set determining unit 1005, configured to determine a third mail set where the keywords are located from the level 2 cache file.

A search results acquiring unit 1006, configured to merge the first mail set, second mail set, and third mail set to obtain search results.

During mail searches in the present embodiment, mail is searched according to the search keywords of the user in the level 1 cache, the level 2 cache file, and the level 3 inverted index files. Moreover, the sizes of the level 1 cache, the level 2 cache file, and the level 3 inverted index files will not exceed their respective preset threshold values. Thus, separate searches may be conducted on the three of them so as to reduce the frequency of hard disk reading and writing, increase mail searching speed, and also increase hard disk IO performance.

The modules/units described above can be implemented as software components executing on one or more processors, as hardware such as programmable logic devices and/or Application Specific Integrated Circuits designed to perform certain functions or a combination thereof. In some embodiments, the modules/units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules/units may be implemented on a single device or distributed across multiple devices. The functions of the modules/units may be merged into one another or further split into multiple sub-modules/sub-units.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for electronic mail message processing, comprising:

obtaining a set of keywords associated with an electronic mail message;

updating, using one or more computer processors and based at least in part on the set of keywords, a set of inverted index records stored in a level 1 cache;

determining whether size of the set of inverted index records stored in the level 1 cache exceeds a first preset threshold value;

in the event that the first preset threshold value is exceeded, transferring the set of inverted index records in the level 1 cache to a level 2 cache;

determining whether size of a level 2 cache file exceeds a second preset threshold value;

in the event that the second preset threshold value is exceeded, transferring, according to a path file, inverted index records in the level 2 cache file to a level 3 cache storing a set of inverted index files; wherein the path file stores mapping relationship information of the keywords and corresponding level 3 inverted index files;

determining whether size of a level 3 inverted index file exceeds a third preset threshold value;

in the event that the size of the level 3 inverted index file exceeds the third preset threshold value, splitting the level 3 inverted index file into two inverted index sub-files; and updating the path file according to the two split inverted index sub-files.

2. The method of claim 1, wherein transferring the inverted index records in the level 2 cache file to the level 3 inverted index files comprises:

fetching the level 2 inverted index records in the level 2 cache file into memory;

using the path file as a basis to determine the level 3 inverted index files corresponding to keywords in the level 2 inverted index records; and transferring the level 2 inverted index records to the determined level 3 inverted index files according to the keywords.

3. The method of claim 2, wherein transferring the inverted index records in the level 2 cache file to the determined level 3 inverted index files according to the keywords is performed in append mode.

4. The method of claim 2, wherein a level 3 inverted index file comprises an initial static compressed file and an incremental file.

5. The method of claim 4, wherein transferring the inverted index records in the level 2 cache file to the level 3 inverted index files according to the keywords includes:

transferring the level 2 inverted index records to the incremental file according to the keywords;

determining whether the incremental file exceeds an incremental threshold value;

in the event that the incremental threshold value is exceeded, decompressing the initial static compressed file to obtain a decompressed initial static file;

merging the decompressed initial static file and the incremental file to obtain a merged file; and compressing the merged file to generate a current static compressed file.

6. The method of claim 1, further comprising:

obtaining a set of one or more search keywords submitted by a user;

determining, according to the path file, level 3 inverted index files corresponding to the search keywords submitted by the user;

determining a first mail set that includes the search keywords based on the level 3 inverted index files, a second mail set that includes the search keywords based on the level 1 cache, and a third mail set that includes the search keywords based on the level 2 cache file; and merging the first mail set, second mail set, and third mail set to obtain search results.

7. A system for processing electronic mail messages, comprising:

one or more processors configured to:

obtain a set of keywords associated with an electronic mail message;

update, based at least in part on the set of keywords, a set of inverted index records stored in a level 1 cache;

determine whether size of the set of inverted index records stored in the level 1 cache exceeds a first preset threshold value;

in the event that the first preset threshold value is exceeded, transfer the set of inverted index records in the level 1 cache to a level 2 cache;

determine whether size of a level 2 cache file exceeds a second preset threshold value;

in the event that the second preset threshold value is exceeded, transfer, according to a path file, inverted index records in the level 2 cache file to a level 3 cache storing a set of inverted index files; wherein the path file stores mapping relationship information of the keywords and corresponding level 3 inverted index files;

determine whether size of a level 3 inverted index file exceeds a third preset threshold value;

in the event that the size of the level 3 inverted index file exceeds the third preset threshold value, split the level 3 inverted index file into two inverted index sub-files; and update the path file according to the two split inverted index sub-files; and one or more memories coupled to the one or more processors, configured to provide the one or more processors with instructions.

8. The system of claim 7, wherein to transfer the inverted index records in the level 2 cache file to the level 3 inverted index files comprises to:

fetch the level 2 inverted index records in the level 2 cache file into memory;

use the path file as a basis to determine the level 3 inverted index files corresponding to keywords in the level 2 inverted index records; and transfer the level 2 inverted index records to the determined level 3 inverted index files according to the keywords.

9. The system of claim 8, wherein to transfer the inverted index records in the level 2 cache file to the determined level 3 inverted index files according to the keywords is performed in append mode.

10. The system of claim 8, wherein a level 3 inverted index file comprises an initial static compressed file and an incremental file.

11. The system of claim 10, wherein to transfer the inverted index records in the level 2 cache file to the level 3 inverted index files according to the keywords includes to:

transfer the level 2 inverted index records to the incremental file according to the keywords;

determine whether the incremental file exceeds an incremental threshold value;

in the event that the incremental threshold value is exceeded, decompress the initial static compressed file to obtain a decompressed initial static file;

merge the decompressed initial static file and the incremental file to obtain a merged file; and compress the merged file to generate a current static compressed file.

12. The system of claim 7, wherein the one or more processors are further configured to:

obtain a set of one or more search keywords submitted by a user;

determine, according to the path file, level 3 inverted index files corresponding to the search keywords submitted by the user;

determine a first mail set that includes the search keywords based on the level 3 inverted index files, a second mail set that includes the search keywords based on the level 1 cache, and a third mail set that includes the search keywords based on the level 2 cache file; and merge the first mail set, second mail set, and third mail set to obtain search results.

13. A computer program product for electronic mail message processing, the computer program product being embodied in a non-transitory computer readable storage medium and comprising computer instructions for:

obtaining a set of keywords associated with an electronic mail message;

updating, based at least in part on the set of keywords, a set of inverted index records stored in a level 1 cache;

determining whether size of the set of inverted index records stored in the level 1 cache exceeds a first preset threshold value;

in the event that the first preset threshold value is exceeded, transferring the set of inverted index records in the level 1 cache to a level 2 cache;

determining whether size of a level 2 cache file exceeds a second preset threshold value;

in the event that the second preset threshold value is exceeded, transferring, according to a path file, inverted index records in the level 2 cache file to a level 3 cache storing a set of inverted index files;

wherein the path file stores mapping relationship information of the keywords and corresponding level 3 inverted index files;

determining whether size of a level 3 inverted index file exceeds a third preset threshold value;

in the event that the size of the level 3 inverted index file exceeds the third preset threshold value, splitting the level 3 inverted index file into two inverted index sub-files; and updating the path file according to the two split inverted index sub-files.

14. A system for processing electronic mail messages, comprising:

one or more processors configured to:
obtain a set of keywords associated with an electronic mail message;
update, based at least in part on the set of keywords, a set of inverted index records stored in a level 1 cache;
determine whether size of the set of inverted index records stored in the level 1 cache exceeds a first preset threshold value;
in the event that the first preset threshold value is exceeded, transfer the set of inverted index records in the level 1 cache to a level 2 cache;
determine whether size of a level 2 cache file exceeds a second preset threshold value;
in the event that the second preset threshold value is exceeded, transfer, according to a path file, inverted index records in the level 2 cache file to a level 3 cache storing a set of inverted index files; wherein the path file stores mapping relationship information of the keywords and corresponding level 3 inverted index files; and wherein to transfer the inverted index records in the level 2 cache file to level 3 inverted index files comprises to:
fetch the level 2 inverted index records in the level 2 cache file into memory;
use the path file as a basis to determine the level 3 inverted index files corresponding to keywords in the level 2 inverted index records, wherein a level 3 inverted index file comprises an initial static compressed file and an incremental file; and
transfer the level 2 inverted index records to the determined level 3 inverted index files according to the keywords; and one or more memories coupled to the one or more processors, configured to provide the one or more processors with instructions.

15. The system of claim 14, wherein the one or more processors are further configured to:
determine whether size of a level 3 inverted index file exceeds a third preset threshold value;
in the event that the size of the level 3 inverted index file exceeds the third preset threshold value, split the level 3 inverted index file into two inverted index sub-files; and
update the path file according to the two split inverted index sub-files.

16. The system of claim 14, wherein to transfer the inverted index records in the level 2 cache file to the determined level 3 inverted index files according to the keywords is performed in append mode.

17. The system of claim 14, wherein to transfer the inverted index records in the level 2 cache file to the level 3 inverted index files according to the keywords includes to:
transfer the level 2 inverted index records to the incremental file according to the keywords;
determine whether the incremental file exceeds an incremental threshold value;
in the event that the incremental threshold value is exceeded, decompress the initial static compressed file to obtain a decompressed initial static file;
merge the decompressed initial static file and the incremental file to obtain a merged file; and
compress the merged file to generate a current static compressed file.

18. The system of claim 14, wherein the one or more processors are further configured to:
obtain a set of one or more search keywords submitted by a user;
determine, according to the path file, level 3 inverted index files corresponding to the search keywords submitted by the user;
determine a first mail set that includes the search keywords based on the level 3 inverted index files, a second mail set that includes the search keywords based on the level 1 cache, and a third mail set that includes the search keywords based on the level 2 cache file; and
merge the first mail set, second mail set, and third mail set to obtain search results.

* * * * *